W. M. WHITE.
DISCHARGE CHAMBER FOR WATER WHEELS.
APPLICATION FILED MAR. 10, 1916.
1,264,729.
Patented Apr. 30, 1918.
2 SHEETS—SHEET 2.
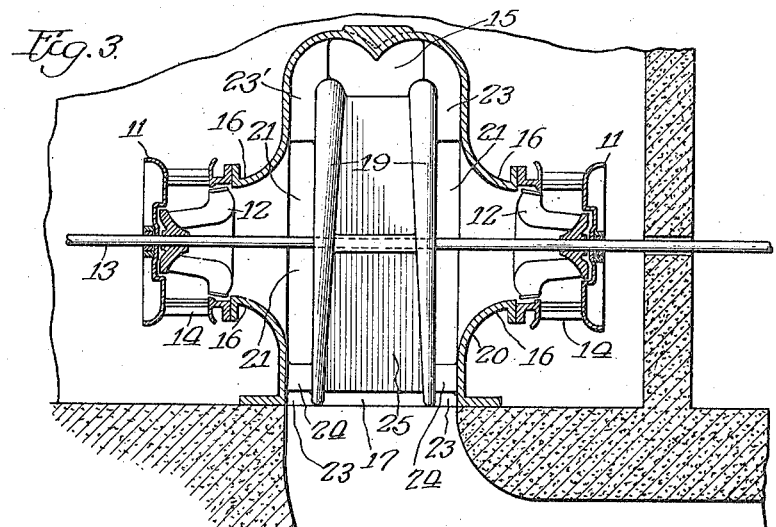
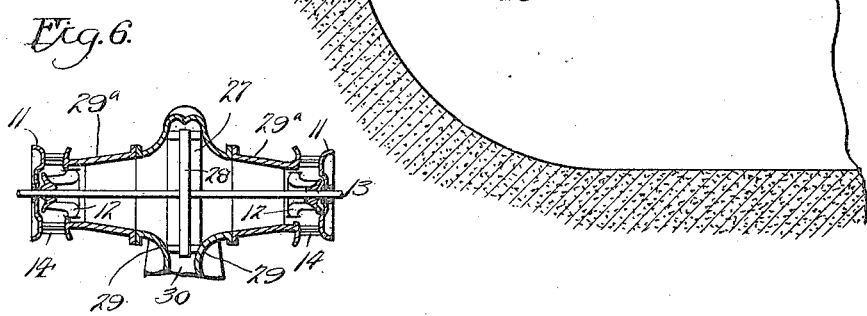
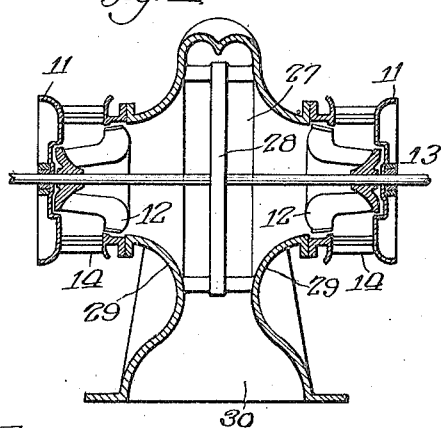
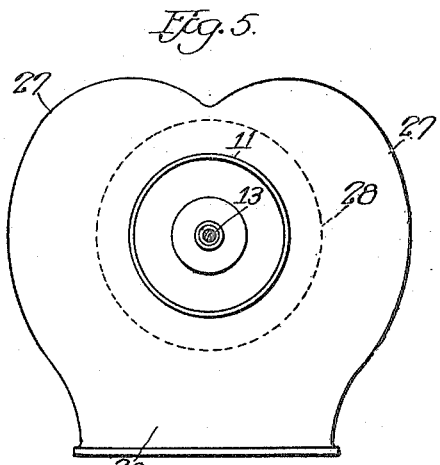

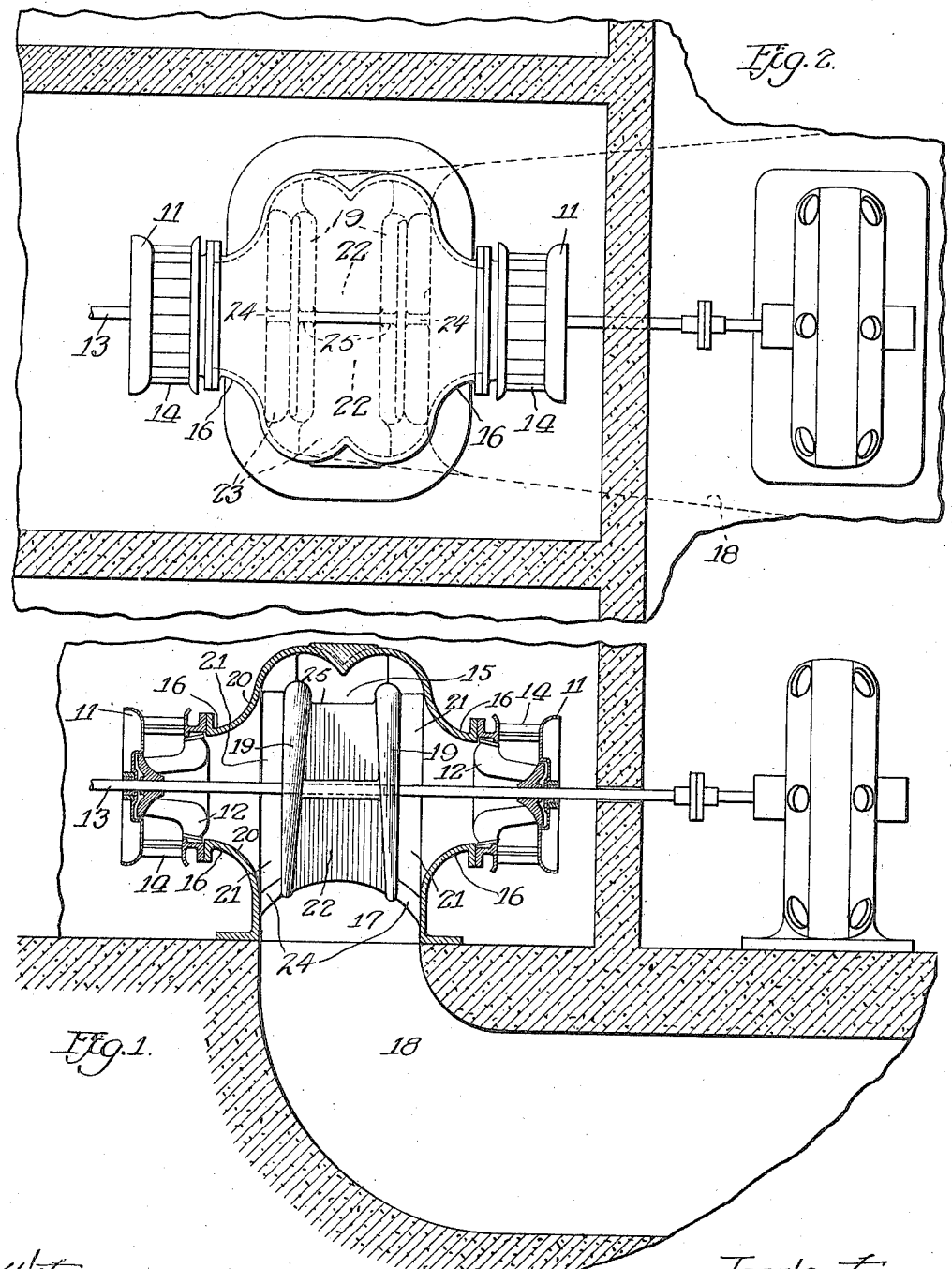

UNITED STATES PATENT OFFICE.

WILLIAM M. WHITE, OF MILWAUKEE, WISCONSIN.

DISCHARGE-CHAMBER FOR WATER-WHEELS.

1,264,729.  Specification of Letters Patent.  Patented Apr. 30, 1918.

Application filed March 10, 1916. Serial No. 83,259.

*To all whom it may concern:*

Be it known that I, WILLIAM M. WHITE, a citizen of the United States, residing at Milwaukee, in the county of Milwaukee and State of Wisconsin, have invented certain new and useful Improvements in Discharge-Chambers for Water-Wheels, of which the following is a specification.

One object of the invention is to provide means for effectively utilizing the energy contained in the water discharged from two coaxially mounted closely and oppositely disposed water wheels, and thereby increase the power plant efficiency of this type of water wheel unit.

A further object of my invention is to provide a center discharge chamber for coaxially mounted, oppositely disposed water wheels having means within said chamber for effectively regaining pressure energy from kinetic energy contained in the water discharged from the water wheel runners.

Another object of my invention is to provide a center discharge chamber for coaxially mounted, oppositely disposed twin water wheels of small axial dimensions, permitting the two wheels to be brought close together and thus provide a water wheel unit requiring small space within a power house, said chamber having means within it for regaining pressure from velocity of the water discharged from the water wheels.

Another object of my invention is to provide a center discharge chamber for twin water wheels, said discharge chamber being provided with radially extending passages communicating with the discharge from the runners of each of the water wheels, said radially extending passages formed by flaring out in all directions the walls forming the discharge chamber and disposing transversely to the discharge from each water wheel a deflecting surface spaced from the radially extending walls of the discharge chamber, a conoidal chamber being formed between said deflecting plate and the walls of said chamber.

The construction herein shown is a specific improvement upon the construction shown in my co-pending application, Serial No. 80,850, filed February 28th, 1916. Reference is also made to my Patent No. 1,223,843, granted to me April 24, 1917, for apparatus for utilizing the hydraucone action of water.

The invention further consists in the several features hereinafter set forth and more particularly defined by claims at the conclusion hereof.

In the drawings:

Figure 1 is a longitudinal vertical sectional view through two coaxially mounted, oppositely disposed water wheels and the discharge chamber embodying the invention, showing a passageway between the deflecting surfaces;

Fig. 2 is a plan view of Fig. 1;

Fig. 3 is a slightly modified form of device shown in Fig. 1;

Fig. 4 is a vertical longitudinal sectional view of a further modification of the invention, showing a single plate;

Fig. 5 is an end elevation of Fig. 4;

Fig. 6 is a modified form of the invention showing a truly conical member mounted adjacent the water wheel runners and connecting the flaring portion of the casing.

Before giving a detailed description of the invention I shall briefly describe the usual form of center discharge chamber for coaxially mounted, oppositely disposed twin water wheels, and describe briefly some of the results of my experiments relating to this invention.

The usual construction of center discharge chamber for coaxially mounted, oppositely disposed twin water wheels consists of two elbows, each connecting with one of the twin runners, and the discharge ends of the elbows merging into one conduit or chamber, usually circular at its outlet, thus providing a common outlet for the water passing through both wheels. The elbows are usually made of increasing cross sectional area in the direction of flow to regain pressure energy from kinetic energy contained in the water discharged at high velocity from the water wheel runners.

I have found by experiments that an elbow of increasing capacity in the direction of flow is an exceedingly poor device for the regain of pressure energy from kinetic energy contained in the water flowing at high velocity into the entrance of the elbow, and experiments have shown that when the water flows from the discharge end of such an elbow, constructed with increasing cross sectional area in the direction of flow, it flows therefrom at widely different velocities throughout the cross section. This is true of an elbow of constant cross sectional area throughout its length, but the difference in velocity is augmented in the case of an elbow of increasing capacity in the direction of flow.

It is well known that a conduit of increasing capacity in the direction of flow, with a straight axis, will efficiently regain pressure energy from the kinetic energy of water flowing at high velocity into the entrance of such conduit, when the velocity throughout the stream flow at entrance is approximately uniform and especially when any variation in the stream flow is symmetrical about the axis of the conduit. As the variations of the velocities of the discharge water from a water wheel are substantially symmetrical about its axis, a regaining section with a straight axis in line with the axis of the runner may be advantageously employed. In order to permit of the use of straight axis regainers so that their functions will not be impaired and so that they may be used in connection with a common discharge chamber occupying a small space as compared to the usual twin elbow construction, previously referred to, I make use of a deflecting surface or surfaces within the chamber.

I have found by experiments that a deflecting surface may be set opposite to the end of such regaining conduit and may be disposed near to the end of the conduit to form an annular outlet between the end of the regaining conduit and the deflecting surface to change the direction of flow of the water without disturbing the regaining effect of such conduit, and I have further found that by placing the deflecting surface in proper relation to the regaining conduit a slight increase of the regaining effect of the combination is obtained.

In the present invention the straight axis regainers form a part of the discharge chamber itself with the result that a smoother flow of the water is provided than one in which the chamber incloses the regaining sections so that the water flows over and around the regaining sections. I am further providing in one embodiment of the present invention a passageway extending between the deflecting surfaces to efficiently direct the water into the outlet from the chamber.

While any suitable form of straight axis regainer may be used to form the entrance passages to the chamber at the discharge ends of the water wheels, I prefer to employ "hydraucone regainers," to which brief reference will now be made.

When a circular jet of water is caused to impinge upon a flat surface placed at right angles to axis of the jet, the water forms itself into a conoidal shape at point of contact with the plate, and is discharged from the base of such conoidal shape radially in all directions along the plane surface. That portion of the stream of enlarged section at point of contact with the plate, I have termed a "hydraucone". For a fuller and more complete description of the action and utility of a hydraucone regainer attention is directed to Patent No. 1,223,843, above cited.

I have performed experiments which show that the water issuing from the base of a free "hydraucone" is at the same velocity as the water entering the apex of the "hydraucone".

I have determined by experiments that when the hydraucone is inclosed in a chamber and said chamber is made of slightly increasingly greater capacity than that required to conform to the shape of a free hydraucone, I am enabled to reduce the velocity of the water discharged from the base of the hydraucone from the velocity entering at the apex with considerable regain of pressure energy from the kinetic energy contained in the water at entrance to the apex of the conoidal chamber.

I am using and combining the results of these experiments in the construction of a center discharge chamber for two coaxially mounted water wheels and providing for the regain of pressure from velocity within conduits preferably disposed substantially symmetrically about the axis of the water wheels and changing the direction of flow of the water from the wheels without decreasing the efficiency of the regainer and at the same time providing a more efficient and compact construction than the usual double elbow discharge chamber.

Referring now more particularly to the drawings, it will be noted that I have shown in Fig. 1 two oppositely disposed water wheels 11, 11 having runners 12, 12 coaxially mounted upon one shaft 13, each water wheel fitted with guide case 14, 14. The water discharges from each of the runners 12, 12 of the water wheels into a center discharge chamber 15 common to both, the walls forming said discharge chamber are flared outwardly in all directions where it connects with each of the water wheels at 16, 16 and is therefore of increasing capacity from its ends toward the center. The discharge chamber is provided with a side outlet 17, connecting with a draft tube 18, of the usual form, which is usually increasing in cross-sectional area in the direction of flow.

In my preferred form I dispose deflecting surfaces 19, 19 transversely to the discharge from the runners and spaced from the walls 20, 20 of the flared portion of the chamber, providing substantially annular passages 21, 21 through which the water discharged from the runner is accommodated. The walls of the center discharge chamber 15, are spaced away from the outer portion of the deflecting plates to form these annular passageways for the water, and the deflecting plates are spaced apart to form a central passageway 22 between them, so that a portion of the water may flow over the edges of, around, behind and between said plates. The deflecting surfaces 19, 19 are braced and held in position by a central web 25 and webs 24, 24. It will be noted that the passageway 22 between the plates is preferably of gradually increasing capacity in the direction of flow for the purpose of regaining pressure from velocity and that some of the water passes through it into the outlet of the chamber.

While the walls 20, 20 constituting the regaining inlets to the chamber may be geometrically conical, I prefer to make them flared, that is, with their walls curving outwardly like a horn and to dispose deflecting surfaces within the chamber spaced apart from the walls in order to form a conoidal chamber of slightly increasingly greater capacity than that required to conform to the shape of a free hydraucone, which would tend to be formed by the discharge of the body of water from the runner, when such body is not constrained by surrounding walls. Thus these regaining inlets and deflecting surfaces form "hydraucone regainers."

By reason of the radially extending passages communicating directly with each runner, the water flowing from the runner in a tangential direction is permitted to pass out radially and more easily conserve the energy contained in said radially flowing water.

There is shown in Fig. 3 radially extending passages 23', 23', of increasing cross sectional area in the direction of flow, communicating with the discharge from each of said conoidal chambers formed by increasing the diameter of the main portion of the chamber and extending the plates 19, 19, whereby a further decrease in velocity with increase of pressure is caused to take place.

My preferred form is to construct such radially extending passage around the periphery of the discharge from the base of the conoidal chamber, but I may make such radially extending passages only a portion of the periphery of the conoidal chamber. The advantages of the said conoidal chamber will be obtained to a greater or less extent by connecting with the discharge of each of the runners conical conduits increasing in capacity in the direction of the flow, and preferably symmetrical about the axis of the runner, said conduits forming passages communicating between the runner and the apex of the conoidal chamber. Referring particularly to Fig. 6, it will be seen that I may employ, if desired, a truly conical portion 29ª connecting the water wheel 11 with the casing 27 the advantages of which are described above.

Another form of center discharge chamber consists in locating a collecting chamber 27 around the periphery of the common base 28 of two conoidal chambers 29, Figs. 4 and 5, and preferably forming said collecting chamber with side outlet 30 to communicate with a discharge pipe, or draft tube, of the usual form. The collecting chamber surrounding the base of the hydraucones may be made symmetrical about the vertical centerline, and may be increasing in cross sectional area from the top of the outlet, as shown in Fig. 5.

Following now the action of the water, it is seen that the water discharged at high velocity from the runners is caused to impinge against the surfaces and is deflected radially in all directions and that the enlarged chambers or regainers at point of deflection are so shaped as to regain pressure from the velocity and so conserve energy which would otherwise be wasted, and thereby increase the efficiency of the water wheel unit. The water discharged from the base of the conoidal chambers passes through the annular outlets and is turned without materially affecting the efficiency of the water wheel unit.

I have mentioned an annular outlet at the discharge ends of the conduits and conoidal chambers connecting with the water wheel runners, but I do not limit myself to a continuous annular opening; by annular opening, under this specification, I mean any opening or series of openings of essentially greater dimension circumferentially than axially, and especially such an opening or openings as will permit the water to be discharged radially to the axis of the water wheels and permit of reasonably close proximity of the ends of the conduits and said conoidal chambers, and at the same time accommodate the water discharged from the water wheels.

In the above specification, I have referred to twin water wheels but the wheels need not necessarily be of the same capacity.

On the outlet side of the discharge chamber the passageways between the walls and the deflecting plate or plates communicate directly with the conduit leading from the discharge chamber.

I have referred in the specification to an outlet from the discharge chamber, but I may make a multiple of outlets depending upon the convenience of construction of the center discharge chamber with reference to the power house wherein it may be located.

The invention thus embodies a discharge chamber for a pair of coaxially mounted, oppositely disposed water wheels provided with regainers forming part of the walls of the chamber and with means for changing the direction of flow of the discharge water from the wheel from axial to radial within a short axial distance, whereby an efficient, compact regaining discharge chamber is provided and one which provides for smoothness of flow of the discharge water.

It will be understood that the constructions herein shown are capable of modification and such modifications as are within the scope of my claims I consider within the spirit of my invention.

I do not, however, claim broadly the combination of a water wheel and a discharge passage having a deflector in said passage which causes the divergent flow of the water in a space progressively increasing in capacity as that is claimed in my copending application No. 769,791, entitled, "hydraulic regainers," nor do I claim the method of operating water wheels which consists in passing an amount of water through a wheel in excess of the amount required for the maximum efficiency of the wheel, nor by passing an amount of water through the wheel by reason of excess speed at excess of the amount required for the maximum efficiency of the wheel; nor by operating discharge water wheels by means of utilizing energy of discharged water to produce an effective head; nor by utilizing the centrifugal force of the whirl of the body of water at the discharge of the water wheel; the same being included in my copending application No. 774,528, for "method of increasing head."

I do not claim herein the invention as described above but show several elements in common for the purpose of clearness and explanation. I therefore do not intend to dedicate to the public, matter herein shown but not claimed which matter is in common with the above referred to copending applications and which is therein fully described and claimed.

I claim:

1. The combination, with a pair of oppositely disposed, coaxially mounted water wheels, of a common discharge chamber for said wheels, a hydraucone regainer disposed at the discharge end of each of said wheels, the walls of said chamber forming the side walls of said regainers.

2. The combination, with a pair of oppositely disposed coaxially mounted water wheels, of a common discharge chamber for said wheels, flared tube regainers forming part of the walls of said chamber disposed at the discharge end of said wheels, and means within said chamber for abruptly changing the direction of flow of the water from axial to radial.

3. The combination, with a pair of oppositely disposed coaxially mounted water wheels, of a common discharge chamber for said wheels, flared tube regainers forming part of the walls of said chamber and symmetrically disposed about the axis and at the discharge end of said wheels, and means within said chamber providing deflecting surfaces coöperating with said regainers and for abruptly changing the direction of flow of the water from axial to radial.

4. The combination, with a pair of oppositely disposed coaxially mounted water wheels, of a common discharge chamber for said wheels, a pair of hydraucone regainers disposed at the discharge ends of said wheels and spaced apart to form a medial passage therebetween, the walls of said chamber forming the side walls of said regainers, and the deflecting surfaces which with a portion of the chamber form said medial passage.

5. The combination with a pair of oppositely disposed coaxially mounted water wheels, of deflecting plates projecting across the discharge passage from each of the water wheels, flared walls forming passages connecting with each of the water wheels, said flared walls spaced from said deflecting plates to form substantially annular outlets between said wheels and said plates, a collecting chamber including said flared walls and surrounding said annular openings and forming a passageway for the water discharged through said annular openings.

6. The combination, with a pair of oppositely disposed coaxially mounted water wheels, of a discharge chamber for said wheels, the walls of said discharge chamber flaring outwardly from the axis of said wheels at points of connection with said wheels, deflecting plates within said chamber and projecting across the discharge from each of the water wheel runners and disposed to form annular outlets with the walls of said chamber for the water discharged from the runners.

7. The combination, with a pair of coaxially mounted, oppositely disposed water wheels, of a center discharge chamber constructed to receive the water discharged from said wheels, deflecting plates within said chamber projected across and spaced from the discharge passage of each of the water wheel runners, said plates disposed to form passages between the edges of said plates and the walls of said chamber, and between the plates themselves, whereby the water discharged axially from the water wheel runners may impinge against the plates and be deflected radially in all directions and flow along, over and around said plates.

8. The combination, with a pair of oppositely disposed coaxially mounted water wheels, of a common discharge chamber for said wheels having an outlet and flared walls forming inlets for the discharge water from the wheels, a deflecting surface disposed transversely of and adjacent to each of said inlets, said deflecting surfaces being spaced from the walls of the chamber to form annular passages and being spaced from each other to form a passageway therebetween extending to the outlet of said chamber, and a conduit of gradually increasing capacity in the direction of flow communicating with the outlet to said chamber.

9. The combination, with a pair of oppositely disposed coaxially mounted water wheels, of a hydraucone regainer disposed at the discharge end of each of said wheels, and a casing connecting the conoidal walls of said regainers to form a common discharge chamber for said wheels.

10. The combination with a pair of oppositely disposed, coaxially mounted water wheels, of a discharge chamber for said wheels, the walls of said discharge chamber flaring outwardly from the axis of said wheels at the point of connection with said wheels, deflecting plates within said chambers and projecting across the discharge from each of the water wheel runners and disposed to form annular outlets with the walls of said chamber of the water discharged from the runners, said walls of said discharge chamber and said deflecting plates being projected radially to form passages radial in extent, said passage being of increasing cross sectional area in the direction of flow and located around and communicating with the discharge from said annular outlets.

Signed at Chicago, Illinois, this 7th day of March, 1916.

WILLIAM M. WHITE.

Witnesses:
C. T. MURRAY,
T. D. BUTLER.

Copies of this patent may be obtained for five cents each, by addressing the "Commissioner of Patents, Washington, D. C."

It is hereby certified that in Letters Patent No. 1,264,729, granted April 30, 1918, upon the application of William M. White, of Milwaukee, Wisconsin, for an improvement in "Discharge-Chambers for Water-Wheels," an error appears in the printed specification requiring correction as follows: Page 4, line 78, claim 4, strike out the article "the" and insert the words *said chamber having;* and that the said Letters Patent should be read with this correction therein that the same may conform to the record of the case in the Patent Office.

Signed and sealed this 4th day of June, A. D., 1918.

[SEAL.]

F. W. H. CLAY,

*Acting Commissioner of Patents.*

Cl. 253—104.